United States Patent
Teshome et al.

(10) Patent No.: US 10,067,562 B2
(45) Date of Patent: Sep. 4, 2018

(54) DISPLAY APPARATUS AND IMAGE CORRECTION METHOD THEREOF

(71) Applicant: SAMSUNG ELECTRONICS CO., LTD., Suwon-si (KR)

(72) Inventors: Mikiyas Teshome, Suwon-si (KR); Nam-su Ha, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 177 days.

(21) Appl. No.: 15/087,180

(22) Filed: Mar. 31, 2016

(65) Prior Publication Data

US 2016/0378183 A1 Dec. 29, 2016

(30) Foreign Application Priority Data

Jun. 26, 2015 (KR) .................. 10-2015-0091412

(51) Int. Cl.
*G06K 9/00* (2006.01)
*G06F 3/01* (2006.01)

(52) U.S. Cl.
CPC .......... *G06F 3/013* (2013.01); *G06K 9/00248* (2013.01); *G06K 9/00604* (2013.01)

(58) Field of Classification Search
CPC . G06F 3/013; G06K 9/00248; G06K 9/00604
See application file for complete search history.

(56) References Cited

U.S. PATENT DOCUMENTS

| 6,246,779 | B1* | 6/2001 | Fukui | G06K 9/00268 |
| | | | | 382/100 |
| 6,608,615 | B1* | 8/2003 | Martins | G06F 3/013 |
| | | | | 345/156 |
| 8,207,999 | B2 | 6/2012 | Lee et al. | |
| 8,514,262 | B2 | 8/2013 | Ueno et al. | |
| 9,111,171 | B2 | 8/2015 | Son et al. | |
| 9,317,956 | B2* | 4/2016 | Lee | G06T 15/00 |

(Continued)

FOREIGN PATENT DOCUMENTS

EP 2634727 A2 9/2013
JP 2001-136501 A 5/2001

(Continued)

OTHER PUBLICATIONS

Communication dated Dec. 12, 2016, issued by the European Patent Office in counterpart European Application No. 16161129.8.

(Continued)

*Primary Examiner* — Shefali D Goradia
(74) *Attorney, Agent, or Firm* — Sughrue Mion, PLLC

(57) ABSTRACT

A display apparatus for a video call is provided. The display apparatus includes a display configured to display a first image received from an external apparatus; a communication unit configured to receive a second image generated by capturing a user while the first image is displayed; an image processor configured to detect a point of gaze of the user from the second image; and a controller configured to determine whether the point of gaze is located in a preset region of the first image and control the communication unit to transmit the second image or a third image that is obtained by editing the point of gaze in the second image to the external apparatus based on a determination result.

13 Claims, 11 Drawing Sheets

(56) References Cited

U.S. PATENT DOCUMENTS

| | | | |
|---|---|---|---|
| 2008/0297589 A1* | 12/2008 | Kurtz | H04N 7/147 348/14.16 |
| 2013/0070046 A1 | 3/2013 | Wolf et al. | |
| 2014/0016871 A1 | 1/2014 | Son et al. | |
| 2014/0267584 A1 | 9/2014 | Atzpadin et al. | |
| 2014/0362170 A1 | 12/2014 | Walker | |
| 2014/0368602 A1 | 12/2014 | Woodgate et al. | |
| 2015/0339512 A1 | 11/2015 | Son et al. | |

FOREIGN PATENT DOCUMENTS

| | | |
|---|---|---|
| JP | 2010-239583 A | 10/2010 |
| KR | 10-2014-0010541 A | 1/2014 |
| KR | 10-2015-0029317 A | 3/2015 |

OTHER PUBLICATIONS

Communication dated Jan. 24, 2018, issued by the European Patent Office in counterpart European Application No. 16161129.8.
Communication dated Jun. 29, 2018, issued by the European Patent Office in counterpart European Application No. 16161129.8.

* cited by examiner

DISPLAY APPARATUS AND IMAGE CORRECTION METHOD THEREOF

CROSS-REFERENCE TO RELATED APPLICATION

This application claims priority from Korean Patent Application No. 10-2015-0091412, filed on Jun. 26, 2015, in the Korean Intellectual Property Office, the disclosure of which is incorporated herein by reference in its entirety.

BACKGROUND

1. Field

Apparatuses and methods consistent with exemplary embodiments relate to a display apparatus and an image correction method thereof, and more particularly, to a display apparatus and an image correction method for correcting a point of gaze of a user during video calling.

2. Description of the Related Art

A video call service is provided using an image as well as voice. Accordingly, the video call service requires a display apparatus, e.g., a TV, for displaying a face of a counterpart and an imaging apparatus, e.g., a camera, for capturing the user.

Due to a difference between a position of a screen in which the face of the counterpart is displayed and a position in which the imaging apparatus is located, the counterpart may feel as if the caller is not gazing at the counterpart caller.

For example, in response to the imaging apparatus being located at an upper side of the display apparatus, even when the user is looking directly at a screen, the captured image may appear as if the user is looking down since the image apparatus captures the user from an upper position.

As a result, the counterpart is likely to feel that the caller is talking without eye contact.

SUMMARY

Exemplary embodiments may overcome the above disadvantages and other disadvantages not described above. However, an exemplary embodiment is not necessarily required to overcome the disadvantages described above.

One or more exemplary embodiments may provide a display apparatus and a method for correcting an image and transmitting the corrected image to an external apparatus if it is determined that such image correction is necessary during a video call.

According to an aspect of an exemplary embodiment, there is provided a display apparatus comprising: a display configured to display a first image received from an external apparatus; a communication unit configured to receive a second image generated by capturing a user while the first image is displayed; an image processor configured to detect a point of gaze of the user from the second image; and a controller configured to determine whether the point of gaze is located in a preset region of the first image and control the communication unit to transmit the second image or a third image that is obtained by editing the point of gaze in the second image to the external apparatus based on a determination result.

The controller is further configured to control the communication unit to transmit the second image to the external apparatus in response to the point of gaze being not located in the preset region of the first image and control the communication unit to transmit the third image to the external apparatus in response to the point of gaze being located in the preset region of the first image.

The preset region of the first image is a region corresponding to an eye of a person in the first image.

The image processor is further configured to detect an eye of a person from the first image, and wherein the controller is further configured to control the communication unit to transmit the second image to the external apparatus in response to no eyes being detected from the first image.

The image processor is further configured to detect an iris of the user from the second image and generate the third image by changing a position of the detected iris to a preset position.

The display is further configured to display a plurality of images received respectively from a plurality of external apparatuses, and the controller is further configured to determine whether the point of gaze is located in a preset region in each of the plurality of images.

The controller is further configured to determine a counterpart image among the plurality of images, the point of gaze being located in the preset region of the counterpart image, and control the communication unit to transmit the counterpart image to a corresponding external apparatus among the plurality of external apparatuses.

The controller is further configured to controls the communication unit to transmit the second image to remaining external apparatuses.

According to another aspect of an exemplary embodiment, there is provided a video call system comprising: a display apparatus configured to receive a first image from an external apparatus and display the first image; and an imaging apparatus configured to generating a second image by capturing a user while the first image is displayed, wherein the display apparatus is further configured to detect a point of gaze of the user from the second image, determine whether the point of gaze is located in a preset region of the first image, and transmit the second image or a third image that is obtained by editing the point of gaze in the second image to the external apparatus according to a determination result.

According to another aspect of an exemplary embodiment, there is provided an image correction method of a display apparatus, the method comprising: displaying a first image received from an external apparatus; receiving a second image generated by capturing a user while the first image is displayed; detecting a point of gaze of the user from the second image; determining whether the point of gaze is located in a preset region of the first image; and transmitting the second image or a third image that is obtained by editing the point of gaze in the second image to the external apparatus based on a determination result.

The transmitting comprises transmitting the second image to the external apparatus in response to the point of gaze being not located in the preset region of the first image and transmitting the third image to the external apparatus in response to the point of gaze being located in the preset region of the first image.

The preset region of the first image is a region corresponding to an eye of a person in the first image.

The image correction method may further comprise detecting an eye of a person from the first image, and the transmitting comprises transmitting the second image to the external apparatus in response to no eyes being detected from the first image.

The image correction method may further comprise: detecting an iris of the user from the second image; and generating the third image by changing a position of the detected iris to a preset position.

The displaying comprises displaying a plurality of images received from a plurality of external apparatuses including the external apparatus, and wherein the determining comprises determining whether the point of gaze is located in a preset region in each of the plurality of images.

The determining comprises determining a counterpart image among the plurality of images, the point of gaze being located in the preset region of the counterpart image, and wherein the transmitting comprises transmitting the counterpart image to a corresponding external apparatus among the plurality of external apparatuses.

The transmitting comprises transmitting the second image to remaining external apparatuses.

According to another aspect of an exemplary embodiment, there is provided a non-transitory recording medium in which a program for executing an image correction method is stored, the method comprising: displaying a first image received from an external apparatus; receiving a second image generated by capturing a user while the first image is displayed; detecting a point of gaze of the user from the second image; determining whether the point of gaze is located in a preset region of the first image; and transmitting the second image or a third image that is obtained by editing the point of gaze in the second image to the external apparatus based on a determination result.

BRIEF DESCRIPTION OF THE DRAWINGS

The above and/or other aspects will be more apparent by describing certain exemplary embodiments with reference to the accompanying drawings, in which.

DETAILED DESCRIPTION OF THE EXEMPLARY EMBODIMENTS

Figure 1:
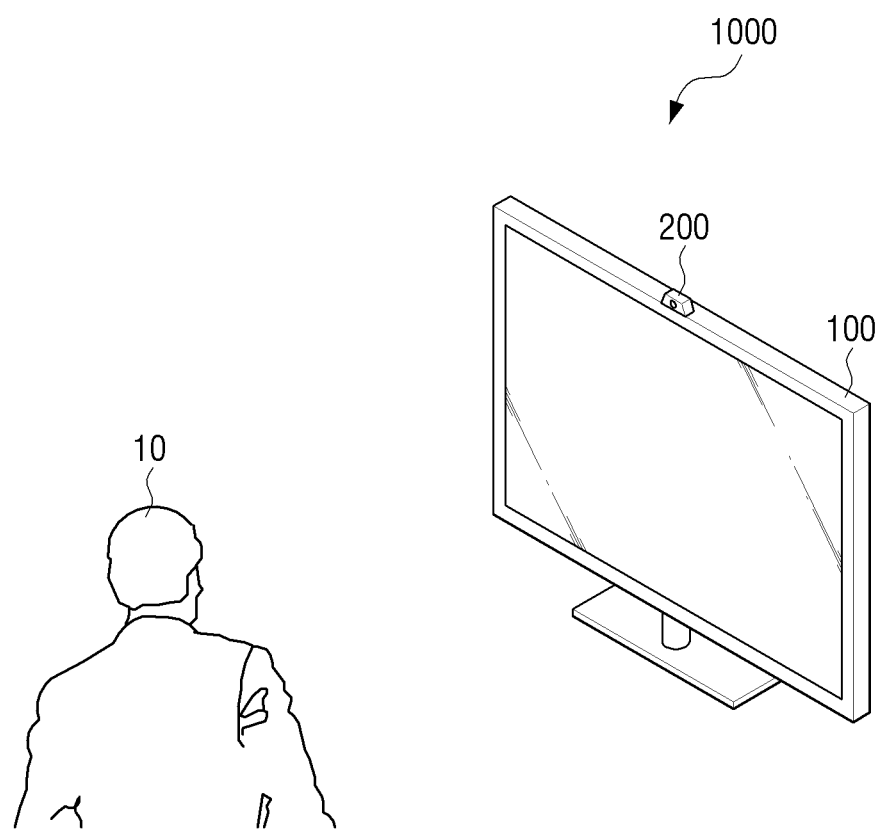
FIG. 1 is a diagram illustrating a video call system according to an exemplary embodiment.

Hereinafter, the exemplary embodiments are described in greater detail with reference to the accompanying drawings.

In the following description, unless otherwise described, the same reference numerals are used for the same elements when they are depicted in different drawings. The matters defined in the description, such as detailed construction and elements, are provided to assist in a comprehensive understanding of the exemplary embodiments. Thus, it is understood that the exemplary embodiments can be carried out without those specifically defined matters. Also, functions or elements known in the related art are not described in detail since they would obscure the exemplary embodiments with unnecessary detail.

The terms "first," "second," etc. may be used to describe diverse components, but the components should not be limited by the terms. The terms are only used to distinguish one component from another.

The terms used in the present application are only used to describe the exemplary embodiments, but are not intended to limit the scope of the disclosure. The singular expression also includes the plural meaning as long as it does not differently mean in the context. In the present application, the terms "include" and "consist of" designate the presence of features, numbers, steps, operations, components, elements, or a combination thereof that are written in the specification, but do not exclude the presence or possibility of addition of one or more other features, numbers, steps, operations, components, elements, or a combination thereof.

In the exemplary embodiment of the present invention, a "module" or a "unit" performs at least one function or operation, and may be implemented in hardware, software, or a combination of hardware and software. In addition, a plurality of "modules" or a plurality of "units" may be integrated into at least one module except for a "module" or a "unit" which has to be implemented with specific hardware, and may be implemented with at least one processor (not shown).

FIG. 1 is a diagram illustrating a video call system according to an exemplary embodiment.

Referring to FIG. 1, a video call system 1000 may include a display apparatus 100 and an imaging apparatus 200.

The display apparatus 100 may support a video call function. For example, the display apparatus 100 may be a television (TV), but this is only exemplary. The display apparatus 100 may be implemented with various apparatuses such as a smart phone, a tablet personal computer (PC), a desktop PC, a monitor, a projector, etc.

The display apparatus 100 may receive an image from an external apparatus and display the received image. The image received from the external apparatus may be an image for a counterpart in the video call. In response to the video call counterpart being two or more, images may be received from the two or more external apparatuses, and the display apparatus 100 may simultaneously display two or more received images. Accordingly, the user 10 may perform the video call with the two or more counterparts.

The imaging apparatus 200 may capture an object and generate a still image or a moving image. For example, imaging apparatus 200 may be implemented with a camera including a lens and an image sensor.

The imaging apparatus 200 may capture a scene existing in a display direction of the display apparatus 100 and generate the captured image. The display direction may refer to a screen side, i.e., a front side of the display apparatus 100. For example, the imaging apparatus 200 may be disposed on an upper side of the display apparatus 100 and may image the object as illustrated in FIG. 1.

The imaging apparatus 200 may transmit the captured image in which the object is captured to the display apparatus 100.

The display apparatus 100 may transmit the captured image received from the imaging apparatus 200 to the external apparatus that is an apparatus of the video call counterpart. The display apparatus 100 may transmit an intact image as captured, or alternatively may correct the captured image before transmission.

For example, the display apparatus 100 may transmit the corrected image to the external apparatus if the correction is necessary. Otherwise, the display apparatus 100 may transmit the captured image to the external apparatus without such correction if the correction is unnecessary.

The correction for the captured image may be necessary when the image appears as if the user 10 is looking elsewhere due to a position of the imaging apparatus 200 even through the user is actually looking at the video call counterpart displayed on the display apparatus 100. For example, in response to the imaging apparatus 200 being disposed on the upper side of the display apparatus 100 as illustrated in FIG. 1, although the user actually looks at the counterpart being displayed in the display apparatus 100, the captured image may appear as if the user looks down. If the captured image is transmitted without correction, the counterpart may feel that the user 10 avoid eye contact with the counterpart.

In this case, the display apparatus 100 may determine that the correction for the captured image is necessary. Then, the display apparatus 100 may correct the captured image to appear as if the user 10 is looking directly at the counterpart (i.e., straight ahead), and transmit the corrected image to the counterpart apparatus.

If such correction is not necessary, the display apparatus 100 may transmit the captured image to the counterpart apparatus without correction.

In an exemplary embodiment, the correction may be unnecessary even when the user 10 is not looking at the counterpart. For example, if the user is looking at meeting materials displayed on the screen during a video call conference, such correction of the captured image may be unnecessary.

The display apparatus 100 may be set in such a manner that the corrected image is transmitted only in response to the user 10 looking at an eye of the counterpart on the screen and the captured image is intactly transmitted in response to the user 10 not looking at the eye of the counterpart.

The display apparatus may determine whether to transmit the corrected image or the non-corrected captured image for every frame.

As a result, according to an exemplary embodiment, the eye contact between callers may be appropriately made in video calling.

In an exemplary embodiment, the imaging apparatus 200 may be built in the display apparatus 100. For example, the video call system 1000 may be implemented with an apparatus such as a smart phone including a camera, a laptop PC including a camera, or a TV including a camera.

In an exemplary embodiment, the video call system 1000 may include a plurality of imaging apparatuses to capture the user at various angles. For example, two image apparatuses may be disposed on an upper side and a lower side of the display apparatus 100.

Figure 2:
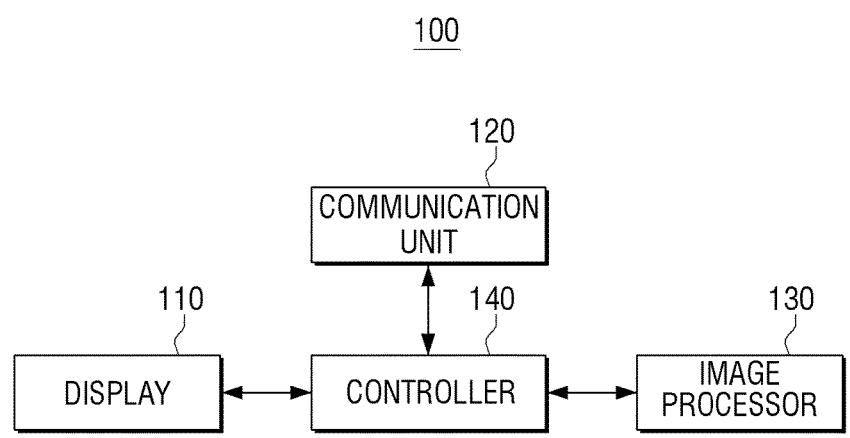
FIG. 2 is a block diagram illustrating a display apparatus according to an exemplary embodiment.

FIG. 2 is a block diagram illustrating the display apparatus 100 according to an exemplary embodiment.

A display 110 may be configured to display various screens including a menu related a function provided by the display apparatus 100, messages, and the like according to control of the controller 140.

The display 110 may be implemented with various types of display. Examples of the types of the display 110 may include, but are not limited to, a liquid crystal display (LCD), a cathode-ray tube (CRT), a plasma display panel (PDP), an organic light emitting diode (OLED), and a transparent OLED (TOLED). The display 110 may be implemented with a touch screen which may detect a touch operation of the user.

The display 110 may be configured to display an image received from an external apparatus, e.g., a counterpart apparatus in a video call. The display 110 may display a counterpart image received from the counterpart apparatus in real time.

A communication unit 120 may be configured to perform communication with an external apparatus. For example, the communication unit 120 may receive an image of the counterpart from the external apparatus during a video call. Also, the communication unit 120 may receive a captured image from the imaging apparatus 200.

The communication unit 120 may transmit the captured image received from the imaging apparatus 200 to the external apparatus without correction. Alternatively, the communication unit 120 may correct the captured image and transmit the corrected image to the external apparatus according to control of a controller 140.

The communication unit 120 may be connected to the external apparatus through a local area network (LAN) and an Internet network. The communication unit 120 may be connected to the external apparatus in a wireless communication manner such as Z-wave, 4 low power wireless personal area network (LoWPAN), radio frequency identification (RFID), long term evolution device to device (LTE D2D), Bluetooth low energy (BLE), general packet radio service (GPRS), Weightless, Edge Zigbee, ANT+, near field communication (NFC), infrared data association (IrDA), digital enhanced cordless telecommunication (DECT), wireless LAN (WLAN), Bluetooth, wireless fidelity (WiFi), WiFi direct, global system for mobile communication system (GSM), universal mobile telecommunication system (UMTS), LTE, or WiBro.

An image processor 130 may be configured to perform preset image processing on an image received from an external apparatus or a pre-stored image. For example, the image processor 130 may perform signal processing such as video decoding, format analysis, or video scaling and jobs such as addition of a graphic user interface (GUI).

The image processor 130 may detect a point of gaze, i.e., the direction in which a user is looking, from the captured image received from the imaging apparatus 200. For example, the image processor 130 may extract information about where on a screen of the display 110 the user is looking, from the captured image.

The image processor 130 may detect the point of gaze of the user from the captured image using various algorithms. For example, the imaging apparatus 200 may include a light emitter to irradiate infrared to the eye of the user when capturing the user. If infrared reflected from a cornea may appear in the captured image, the image processor 130 may detect a pupil by dividing an iris and the pupil based on a position of the reflected infrared, and acquire point of gaze information from the detected pupil.

In an exemplary embodiment, the image processor 130 may detect a position of an eye using a method (for example, Haar-like features) of finding object features from the image. As a result, the image processor 130 may detect the iris and the pupil from the position of the eye using an edge detection method, and detect the point of gaze of the user based on relative positions of the iris and the pupil.

The display apparatus 100 may be coupled to a wearable device such as smart glasses to collect the information about the point of gaze of the user. The smart glasses may capture the eye of the user and transmit the captured image to the display apparatus 100. The image processor 130 may detect the point of gaze of the user from the captured image based on information received from the smart glasses.

The information about the detected point of gaze in one frame may be used to detect a point of gaze in next frame. That is, the image processor 130 may perform eye gaze tracking. The eye gaze tracking method may be performed through various known methods.

The image processor 130 may detect an eye from an image received from the external apparatus, e.g., the counterpart apparatus in a video call. For example, the image processor 130 may detect an eye from the image through the feature extracting method. In this example, the image processor 130 may detect the position of the eye from the image using Haar-like features. In another example, the image processor 130 may detect an eye by detecting a nose from the captured image and detecting corner portions of both eyes close to the nose.

The image processor 130 may generate the corrected image in which the point of gaze of the user is corrected in the captured image. The corrected image will be described below with reference to FIGS. 3A and 3B.

Figure 3A:
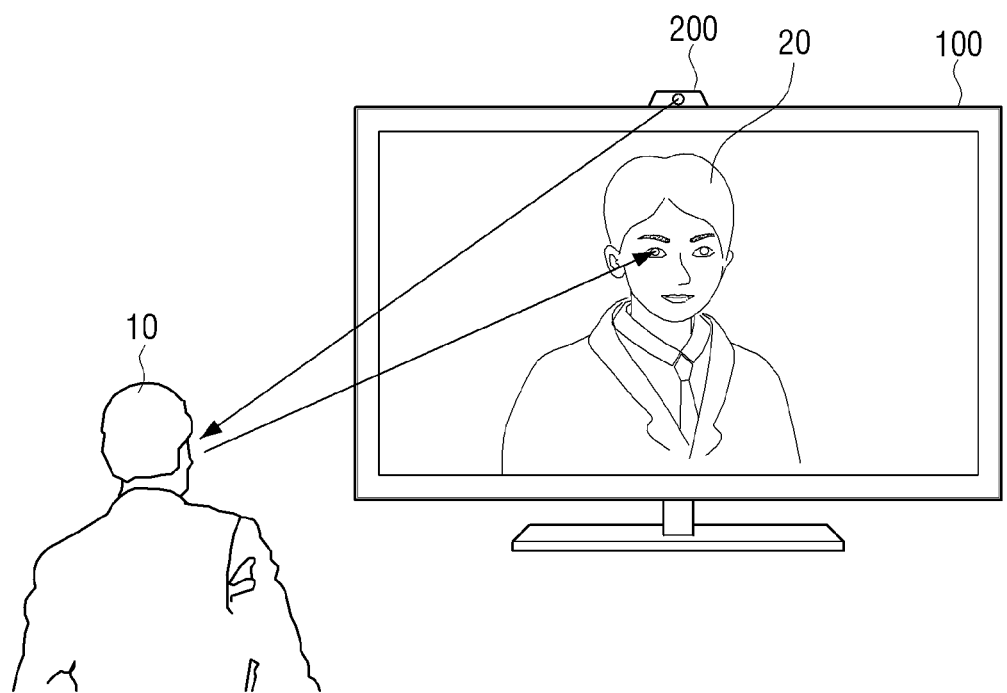
FIGS. 3A and 3B illustrate an image correction method according to an exemplary embodiment.
Figure 3B:
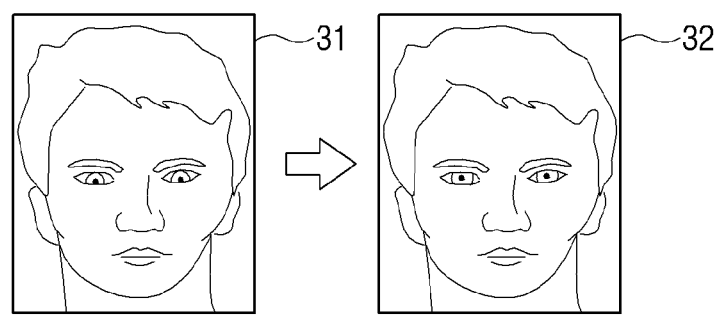

FIGS. 3A and 3B are diagrams illustrating a method of generating a corrected image according to an exemplary embodiment.

If the imaging apparatus 200 is disposed on the upper side of the display apparatus 100 and a user 10 is looking at a counterpart 20 displayed in the display apparatus 100 as illustrated in FIG. 3A, the user appear to be looking down in an image 31 captured by the imaging apparatus 200 as illustrated in FIG. 3B. In this case, the image processor 130 may generate a corrected image 32 by correcting the user's point of gaze in the captured image 31 so that the user appears to be looking straight ahead as in the corrected image 32. The corrected image 32 may be transmitted to the counterpart apparatus and displayed in the counterpart apparatus. Accordingly, the counterpart may recognize that the user 10 is making eye contact with the counterpart.

The image processor 130 may correct the gaze of the user in the captured image through various methods.

For example, the image processor 130 may detect an iris from the captured image received from the imaging apparatus 200, and generate the corrected image to change the point of gaze of the user by changing a display position of the detected iris. The image processor 130 may generate a fake eyeball (i.e., computer generated, computer predicted/estimated, computer enhanced/corrected, or synthetic eyeball), which looks straight ahead, using an eyeball of the user extracted from the captured image. The image processor 130 may generate the corrected image in which the user appears to look ahead by inserting the fake eyeball into an eyeball position of the user.

To more accurately correct the point of gaze of the user, the image processor 130 may generate the corrected image by inserting the fake eyeball and changing a direction a head of the user is facing in the captured image. Head models facing different directions may be pre-stored in a storage unit of the display apparatus 100, and the image processor 130 may change the head direction of the user in the captured image using the pre-stored head models. For example, since the head of the user faces down in the captured image 31 illustrated in FIG. 3B, the image processor 130 may generate the corrected image 32 by adjusting the head direction of the user a little upward in the captured image 31 using a head model of which has a proper a head direction among the head models stored in the storage unit.

In another example, the correction on the point of gaze of the user may be performed using two imaging apparatuses respectively disposed on a lower side and an upper side of the display apparatus 100. In this example, the communication unit 120 may receive a first image captured by the lower side imaging apparatus and a second image captured by the upper side imaging apparatus. The image processor 130 may generate the corrected image in which the user looks straight ahead using the first image and the second image.

In an exemplary embodiment, the image processor 130 may correct the point of gaze of the user in the captured image using other methods.

The controller 140 may control overall operations of the display apparatus 100. For example, the controller 140 may control the display 110 to display a specific screen, control the communication unit 120 to transmit/receive data to/from the external apparatus, and control the image processor 130 to perform an image processing operation.

The controller 140 may determine the user's point of gaze on the screen of the display 110, i.e., a position the user is gazing at on the screen, and perform a control operation according to a determination result. The determining of the user's point of gaze on the screen may be performed through various methods.

For example, the display apparatus 100 may determine the point of gaze on the screen by performing a calibration operation. Specifically, when the user is using the display apparatus 100 for the first time, the controller 140 may request the user to look at four vertices of the display apparatus 100 sequentially. Each time the user gazes at a vertex, the controller 140 may generate reference information about the user's point of gaze by mapping the user's eye image data with a corresponding position of each vertex of the display apparatus 100. The controller 140 may determine the user's point of gaze using the reference information even when the user is looking elsewhere.

The controller 140 may determine the user's point of gaze using other methods.

For example, while the image of the video call counterpart received from the external apparatus is displayed in display 110, if it is determined that the user's point of gaze is located in a preset region of the image being displayed, the controller 140 may control the image processor 130 to generate the corrected image. Also, the controller 140 may control the communication unit 120 to transmit the corrected image to the external apparatus, i.e., the counterpart apparatus of the video call.

If it is determined that the user's point of gaze is not located in the preset region of the image being displayed, the controller 140 may control the communication unit 120 to transmit the captured image without such correction. The image transmission operation will be described in detail below with reference to FIGS. 4 and 5.

FIGS. 4A through 5B are diagrams illustrating a method of generating an image of the user, according to an exemplary embodiment.

Figure 4A:
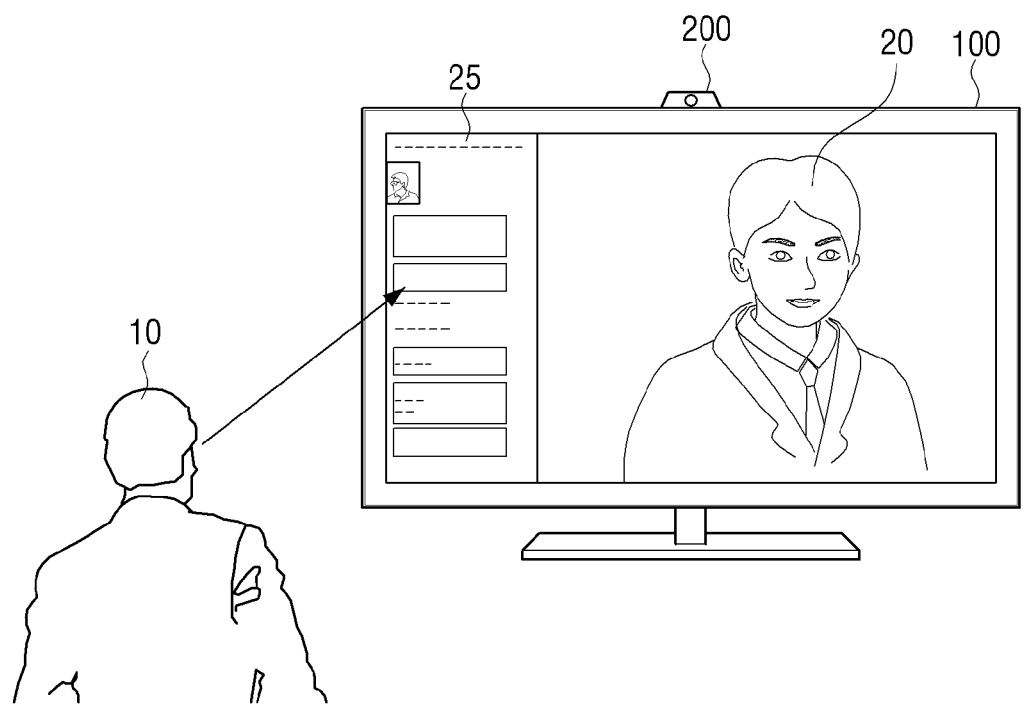
FIGS. 4A and 4B illustrate an image correction method for a situation where a user is looking at meeting material displayed on a display apparatus according to an exemplary embodiment.
Figure 4B:
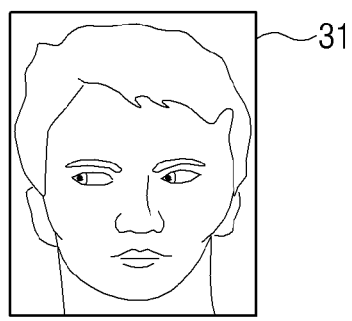

FIG. 4A is a diagram illustrating a situation that a user's point of gaze is not located in a preset position, e.g., a region corresponding to the counterpart 20, of the image displayed in the display apparatus 100 during a video call. For example, if the user 10 is looking at materials 25 for a meeting, the controller 140 may transmit the captured image 31 without correction of the user's eyes as illustrated in FIG. 4B.

Figure 5A:
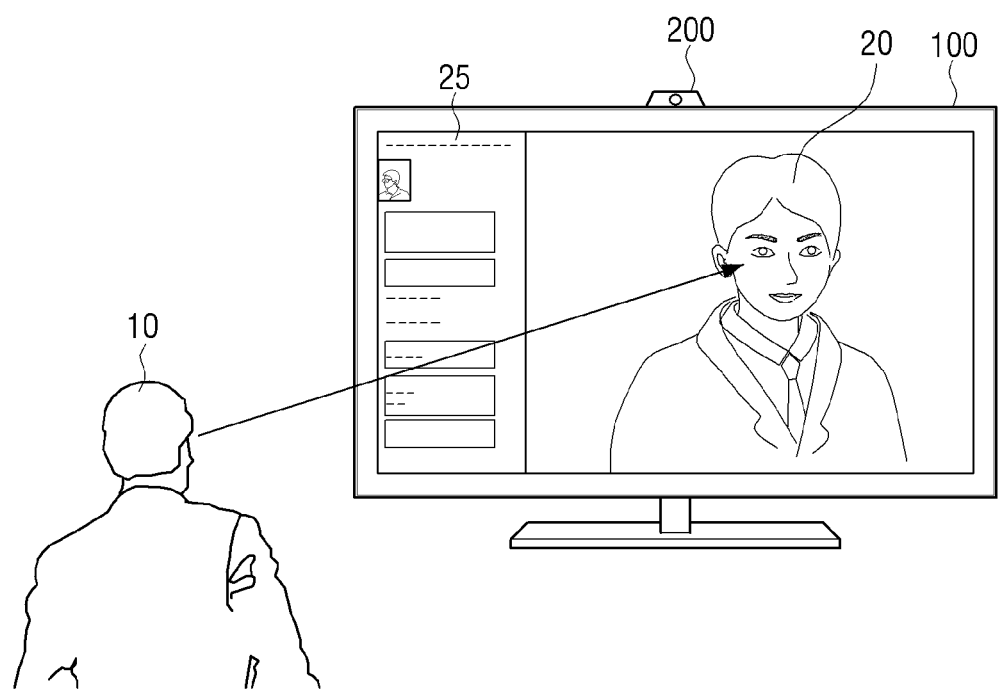
FIGS. 5A and 5B illustrate an image correction method for a situation where a user is looking at a video call counterpart displayed on a display apparatus according to an exemplary embodiment.
Figure 5B:
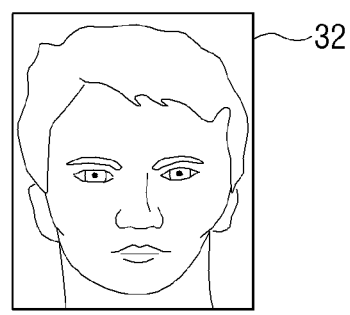

As illustrated in FIG. 5A, if it is determined that the point of gaze of the user 10 is located at a preset position, e.g., within a region corresponding to the counterpart 20, of the image displayed in the display apparatus 100 during a video call, the controller 140 may control the image processor 130 to generate the corrected image 32 in which the user is looking straight ahead as illustrated in FIG. 5B. The controller 140 may transmit the generated corrected image to the external apparatus, that is, the apparatus of the video call counterpart.

In other words, the correction may be performed only when the user is looking at the video call counterpart displayed on the screen, thereby preventing unnecessary correction from being performed.

To implement more accurate eye contact, the display apparatus may perform the correction only when the user is looking at an eye of the video call counterpart. This case will be described below in more detail with reference to FIGS. 6A through 7B.

FIGS. 6A through 7B are diagrams illustrating a method of generating an image of the user, according to another exemplary embodiment.

Figure 6A:
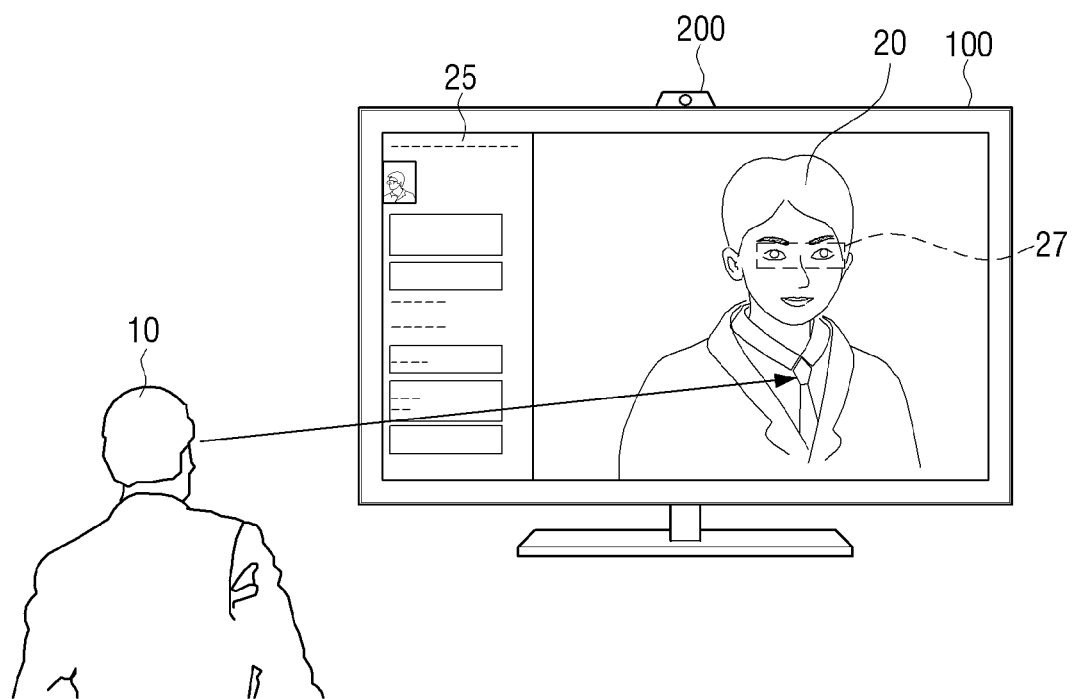
FIGS. 6A and 6B illustrate an image correction method for a situation where a user is not looking at a preset region of an image displayed on a display apparatus according to an exemplary embodiment.
Figure 6B:
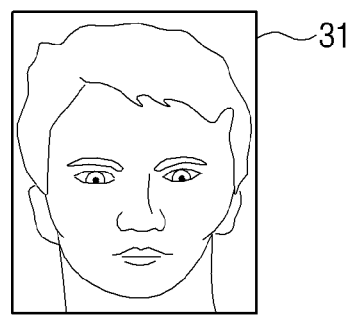

The controller 140 may control the image processor 130 to detect an eye from the image received from the external apparatus. As illustrated in FIG. 6A, if the user's point of gaze is not located in an eye-detected region 27 of a screen displayed in the display apparatus 100, the controller 140 may control the communication unit 120 to transmit the captured image 31 illustrated in FIG. 6B to the external apparatus without correction of the eyes.

Figure 7A:
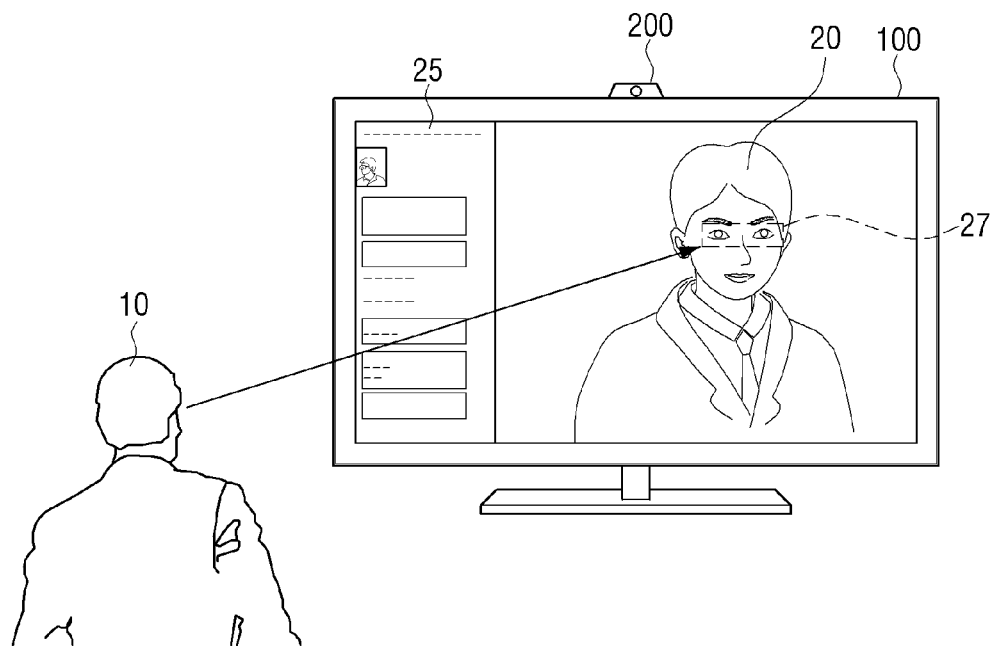
FIGS. 7A and 7B illustrate an image correction method for a situation where a user is looking at a preset region of an image displayed on a display apparatus according to an exemplary embodiment.
Figure 7B:
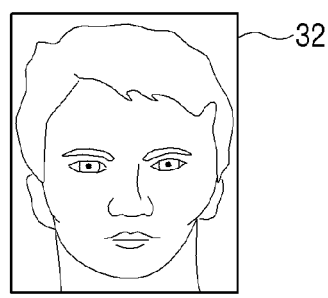

In another example, as illustrated in FIG. 7A, if it is determined that the user is not looking at the eye-detected region 27, the controller 140 may control the image processor 130 to generate the corrected image 32 in which the user's eyes are edited so that the user appears to look ahead as illustrated in FIG. 7B, and control the communication unit 120 to transmit the generated corrected image 32 to the external apparatus.

The region which triggers such correction may be extended. Specifically, even when it is determined that the user's point of gaze is not within the eye-detected region 27, the controller 140 may control the image processor 130 to generate the corrected image 32 if the point of gaze is within a preset distance from the eye-detected region 27. For example, even when the user is looking at a nose or a forehead of the counterpart, the corrected image 32 may be transmitted to the video call counterpart. This is because the user might want to talk to counterpart looking at the nose or the forehead of the counterpart, instead of the eyes.

FIG. 8 is a diagram illustrating a method of generating an image of the user, according to another exemplary embodiment.

Figure 8A:
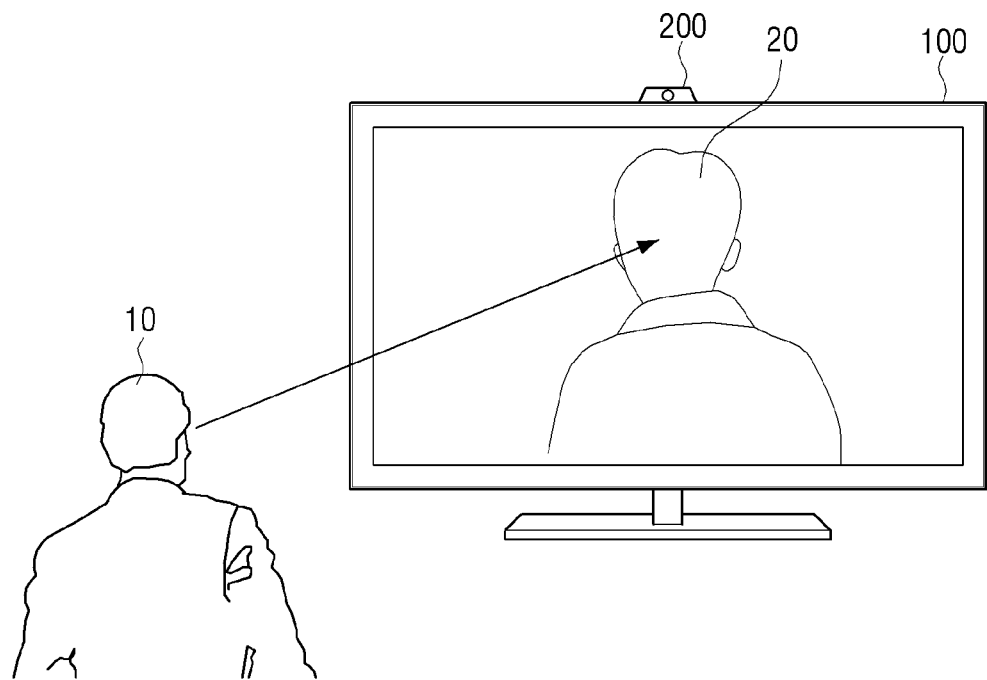
FIGS. 8A and 8B illustrate an image correction method for a situation where an eye is not detected from an image displayed on a display apparatus according to an exemplary embodiment.
Figure 8B:
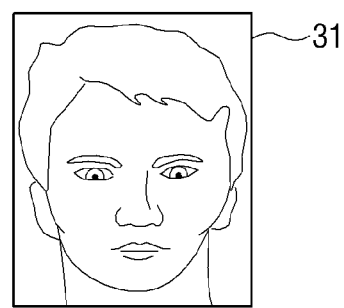

The controller 140 may control the image processor 130 to detect an eye from the image received from the external apparatus. If eye of the counterpart 20 is not detected in the received image since the user 20 turns back as illustrated in FIG. 8A, the controller 140 may control the communication unit 120 to transmit the captured image 31 as illustrated in FIG. 8B without correction of the eyes of the user 10.

The image processor 130 may perform an operation of detecting the counterpart's eye from the image received from the external apparatus, prior to other operations. If the counterpart's eye is not detected, it is determined that there is no need to perform further operations to make eye contact between the user 10 and the counterpart 20, and thus the controller 140 may transmit the captured image 31 to the external apparatus without additional operations, e.g., detecting the gaze of the user from the captured image and determining a position the user is looking at, i.e., point of gaze, on the screen. such unnecessary operations according to the image of the counterpart 20, image processing time for a video call may be reduced.

In an exemplary embodiment, the video call may be set up among more than two persons. Image transmission in video call among more than two persons will be described below with reference to FIGS. 9A and 9B.

Figure 9A:
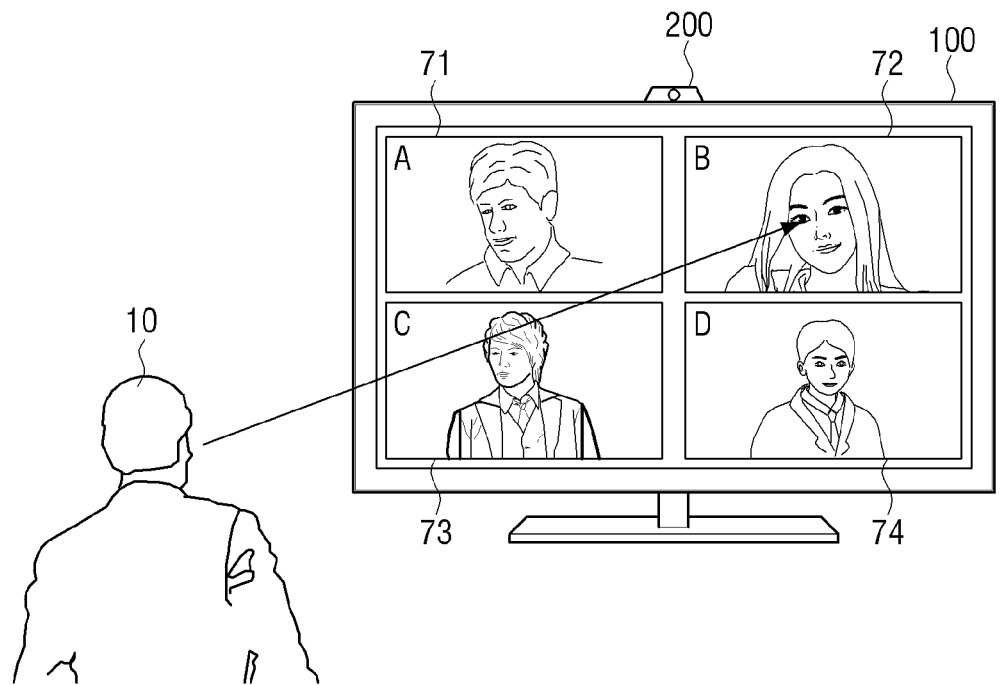
FIGS. 9A and 9B illustrate an image correction method for a situation where multiple video call counterparts are displayed on a display apparatus according to an exemplary embodiment.
Figure 9B:
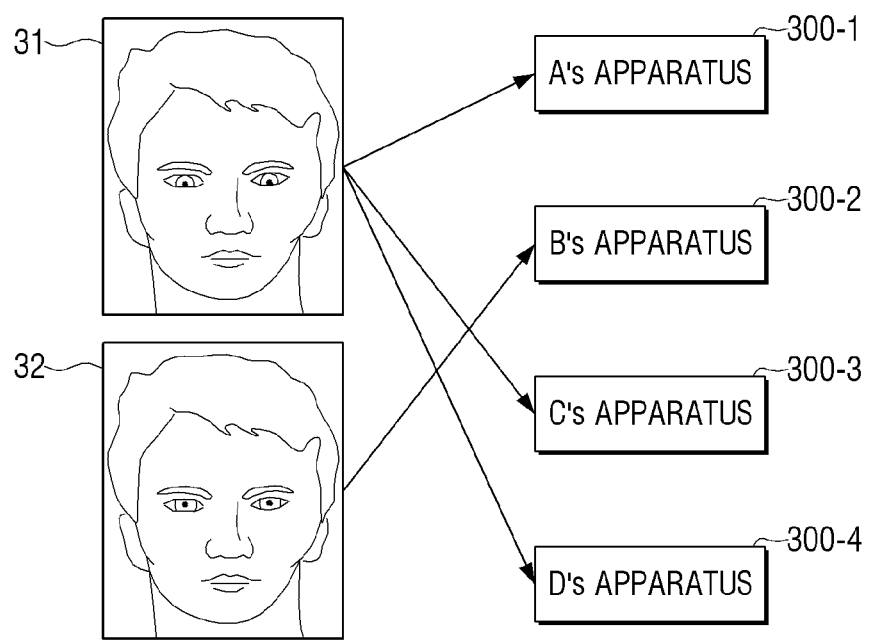

FIGS. 9A and 9B is a diagram illustrating generating an image of a user for a video call according to an exemplary embodiment.

In response to a plurality of images 71, 72, 73, and 74 being respectively received from a plurality of external apparatuses 300-1, 300-2, 300-3, and 300-4, the controller 140 may control the display 110 to display the plurality of images 71 to 74. Accordingly, the user 10 may perform video call with a plurality of counterparts.

The controller 140 may determine whether or not the user's point of gaze is located in a preset region of each of the plurality of images 71 to 74.

For example, the preset region may be an entire region of each image. In another example, the preset region may be an eye-detected region of each image. In another example, the preset region may be obtained by extending the eye-detected region of each image according to preset extension information.

As illustrated in FIG. 9B, the controller 140 may control the communication unit 120 to transmit the corrected image 32 to one or more of the plurality of external apparatuses 300-1, 300-2, 300-3, and 300-4 according to a determination result. The controller 140 may control the communication unit 120 to transmit the non-corrected captured image 31 to remaining external apparatuses to which the corrected image 32 is not transmitted.

For example, information about the counterpart apparatuses and information about positions of the images on the screen may be stored in the storage unit of the display apparatus 100. The controller 140 may determine which one of the images the user is looking at, and transmit a corrected image 32 to the determined counterpart apparatus, according to the stored information.

Referring to FIGS. 9A and 9B, the corrected image 32 may be transmitted to a B apparatus 300-2 corresponding to the image 72 in which the user's point of gaze is located. On the other hand, the non-corrected captured image 31 may be transmitted to remaining apparatuses 300-1, 300-3, and 300-4.

If the corrected image is transmitted to all the counterparts, the counterparts may misunderstand who the user is looking at or talking to. Thus, according to an exemplary embodiment, the corrected image 32 may be transmitted only to a counterpart of which image the user 10 is actually looking at, and the non-corrected captured image 31 may be transmitted to the counterparts. As a result, video callers may feel like they are actually meeting face to face and such misunderstanding may be prevented.

In an exemplary embodiment, the controller 140 may control the image processor 130 to perform the eye detection operation only on an image which is determined as an image where that the user's point of gaze is located. Referring to FIG. 9A, the eye detection may be performed only on the image 72. Accordingly, the image processing time may be reduced by omitting the eye protection operation for the remaining images 71, 73, and 74.

The display apparatus 100 may include all information communication apparatuses supporting functions in the exemplary embodiments, all devices using an application processor (AP), a graphic processing unit (GPU), and a central processing unit (CPU) such as a multimedia apparatus and an application apparatus thereto. For example, the display apparatus 100 may include devices such as a tablet PC, a smart phone, a digital camera, a portable multimedia player (PMP), a media player, a portable gaming terminal, a laptop PC, and a personal digital assistant (PDA) in addition to a mobile communication terminal which may be operated by communication protocols corresponding to various communication systems. The function control method according to an exemplary embodiment may be applied to various display devices such as a digital TV, a digital signage (DS), and a large format display (LFD), and employed.

Figure 10:
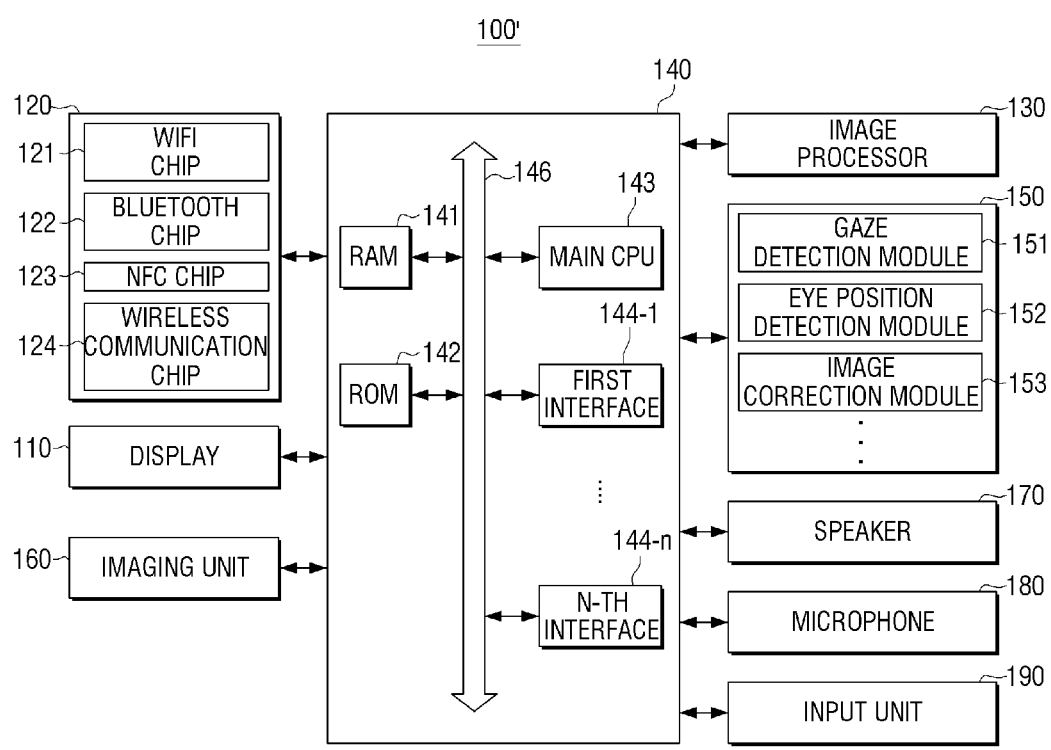
FIG. 10 is a block diagram illustrating a display apparatus according to another exemplary embodiment.

FIG. 10 is a block diagram illustrating a configuration of a display apparatus according to another exemplary embodiment. Detailed description for a portion of a display apparatus 100' overlapping the configuration of the display apparatus 100 in FIG. 2 will be omitted.

Referring to FIG. 10, the display apparatus 100' may include a display 110, a communication unit 120, an image processor 130, a controller 140, a storage unit 150, an imaging unit 160, a speaker 170, a microphone 180, and an input unit 190.

The display 110 may be configured to display various graphic objects according to control of the controller 140. For example, the display 110 may be implemented with a liquid crystal display (LCD). In some examples, the display 110 may be implemented with a cathode-ray tube (CRT), a plasma display panel (PDP), an organic light emitting diode (OLED), and the like. The display 110 may be implemented in a touch screen form which may detect a touch operation of the user.

The communication unit 120 may be configured to perform communication with various types of external apparatuses according to various types of communication methods. The communication unit 120 may include various communication chips such as a WIFI chip 121, a Bluetooth chip 122, a NFC chip 123, and a wireless communication chip 124.

The WIFI chip 121, the Bluetooth chip 122, the NFC chip 123, and the wireless communication chip 124 may perform communication in a WIFI manner, a Bluetooth manner, an NFC manner, and a wireless communication manner, respectively. Among the communication chips, the NFC chip 123 may be a chip configured to operate in the NFC manner using a band of 13.56 MHz among various radio frequency identification (RF-ID) frequency bands such as 135 kHz, 13.56 MHz, 433 MHz, 860 to 960 MHz, and 2.45 GHz. In response to the WIFI chip 121 or the Bluetooth chip 122 being used, the communication unit 120 may first transmit/receive a variety of connection information such as a service set identifier (SSID) and a session key, perform communication connection using the connection information, and transmit/receive a variety of information. The wireless communication chip 124 may be a chip configured to perform communication according to various communication standards, such as Institute of Electrical and Electronics Engineers (IEEE), Zigbee, 3rd generation (3G), 3rd Generation Partnership Project (3GPP), or Long Term Evolution (LTE). The controller 140 may display the image received from the external apparatus through the communication unit 120 in the display 110.

The image processor 130 may be configured to perform preset image processing on an image. For example, the image processor 130 may detect a point of gaze from the image using a gaze detection module 151 of the storage unit 150 and detect a position of an eye from the image using an eye position detection module 152. The image processor 130 may perform correction on the image using an image correction module 153. For example, the image processor 130 may correct the point of gaze of the user in the image.

The image processor 130 may constitute a screen displayed in the display 110. The image processor 130 may include various components such as a codec configured to perform encoding or decoding on video data, a parser, a scaler, a noise filter, or a frame rate conversion module.

For example, the image processor 130 may be implemented with at least one of a processor, an application-specific integrated circuit (ASCI), an embedded processor, a microprocessor, a hardware control logic, a hardware finite state machine (FSM), and a digital signal processor (DSP).

The speaker 170 may be configured to output various alarm sounds and voice messages as well as a variety of audio data processed in an audio processor (not shown).

The audio processor may be configured to perform processing on audio data. The audio processor may perform various processing such as decoding, amplification, noise filtering, and the like on the audio data.

The imaging unit 160 may be configured to capture a still image or a moving image. The imaging unit 160 may include a front imaging unit and a rear imaging unit. The front imaging unit may be disposed in a user direction, that is, a display direction on the basis of the display 110, and the rear imaging unit may be disposed in an opposite direction to the display direction. The imaging unit 160 may perform a function to capture the user during video calling.

The microphone 180 may be configured to receive a user voice or other sounds and convert the received voice or sounds to audio data. The controller 140 may use the user voice input through the microphone 180 in the video call process or convert the user voice to the audio data and store the audio data in the storage unit 150. The controller 140 may transmit the user voice input through the microphone 180 in the video call process to an external apparatus. The controller may recognize the user voice input through the microphone 180 and perform a control operation according to the user voice.

The input unit 190 may be configured to receive a user command for controlling an overall operation of the display apparatus 100. For example, the input unit 190 may be implemented with various types of input devices such as a remote controller, a pointing device, a motion sensor configured to detect a motion of the user, a voice sensor configured to detect the user voice, and a mouse.

The storage unit 150 may store programs such as an operating system (O/S) or various applications. For example, the gaze detection module 151, the eye position detection module 152, and the image correction module 153 may be stored in the storage unit 150.

Head models facing different directions may be stored in the storage unit 150.

A calibration performing result, which may be used to determine point of gaze on the screen may be stored in the storage unit 150.

The controller 140 may control an overall operation of the display apparatus 100' using various programs stored in the storage unit 150.

The controller 140 may include a random access memory (RAM) 141, a read only memory (ROM) 142, a main CPU 143, first to n-th interfaces 144-1 to 144-*n*, and a bus 146. The RAM 141, the ROM 142, the main CPU 143, the first to n-th interfaces 144-1 to 144-*n*, and the like may be electrically coupled through the bus 146.

The first to n-th interfaces 144-1 to 144-*n* may be coupled to the above-described components. One of the interfaces may be a network interface coupled to an external apparatus through a network.

The main CPU 143 accesses the storage unit 150 to perform booting using the O/S stored in the storage unit 150. The main CPU 143 may perform various operations using a variety of modules, programs, content, data, and the like stored in the storage unit 150.

A command set and the like for system booting may be stored in the ROM 142. In response to a turn-on command being input to supply power, the main CPU 143 may copy the O/S stored in the storage unit 150 to the RAM 141 according to a command stored in the ROM 142, and execute the O/S to boot a system. In response to the booting being completed, the main CPU 143 may copy various application programs stored in the storage unit 150 to the RAM 141, and execute the application programs copied to the RAM 141 to perform various operations.

In response to various types of user operations being detected through the imaging unit 160, the microphone 180, and the like, the main CPU 143 may determine whether or not an event matching event information stored in the storage unit 150 is generated using a detected result. The event may be variously set. For example, the event may include an event in which a user touch or button selection is accomplished, an event in which a motion gesture, a voice command, and the like are input, an event in which an application execution command is input, an event in which a content reproduction command is input, an event in which a preset set time or cycle arrives, an event in which a system alarm message is generated, an event in which communication with an external source is accomplished, and the like.

Although not shown in FIG. 10, in some exemplary embodiments, the display apparatus 100' may further include various external input ports for coupling to various external terminals such as a universal serial bus (USB) port to which a USB connector may be couple, a headset, a mouse, and a LAN, a digital multimedia broadcasting (DMB) chip which receives a DMB signal and process the received DMB signal, various sensors, and the like therein.

It has been described that the various exemplary embodiments are realized through the display apparatuses 100 and 100' including the display 110 configured to a screen, but the various exemplary embodiment may be realized through an apparatus not including the display 110. The various exemplary embodiments may be realized through an apparatus such as a set-top box coupled to a display apparatus such as a TV.

For example, the various exemplary embodiments may be realized through an apparatus which detects a point of gaze of the user from a captured image through an imaging apparatus, determines whether or not the detected point of gaze of the user is located in a preset region of an image transmitted from an external apparatus, and transmits the captured image without correction or a corrected image to the external apparatus according to a determination result.

The various exemplary embodiments described herein may be implemented within a recoding medium readable by a computer or an apparatus similar to the computer using software, hardware, or a combination thereof. In the hardware implementation, the exemplary embodiments described herein may be implemented using at least one among ASCIs, DSPs, digital signal processing devices (DSPDs), programmable logic devices (PLDs), field programmable gate arrays (FPGAs), processors, controllers, micro-controllers, microprocessors, and electrical units for performing other functions. In some embodiments, the exemplary embodiments described herein may be implemented with the controller 140 itself. In the software implementation, the exemplary embodiments such as a procedure and a function described herein may be implemented with separate software modules. Each of the software modules may perform one or more functions and operations described herein.

Figure 11:
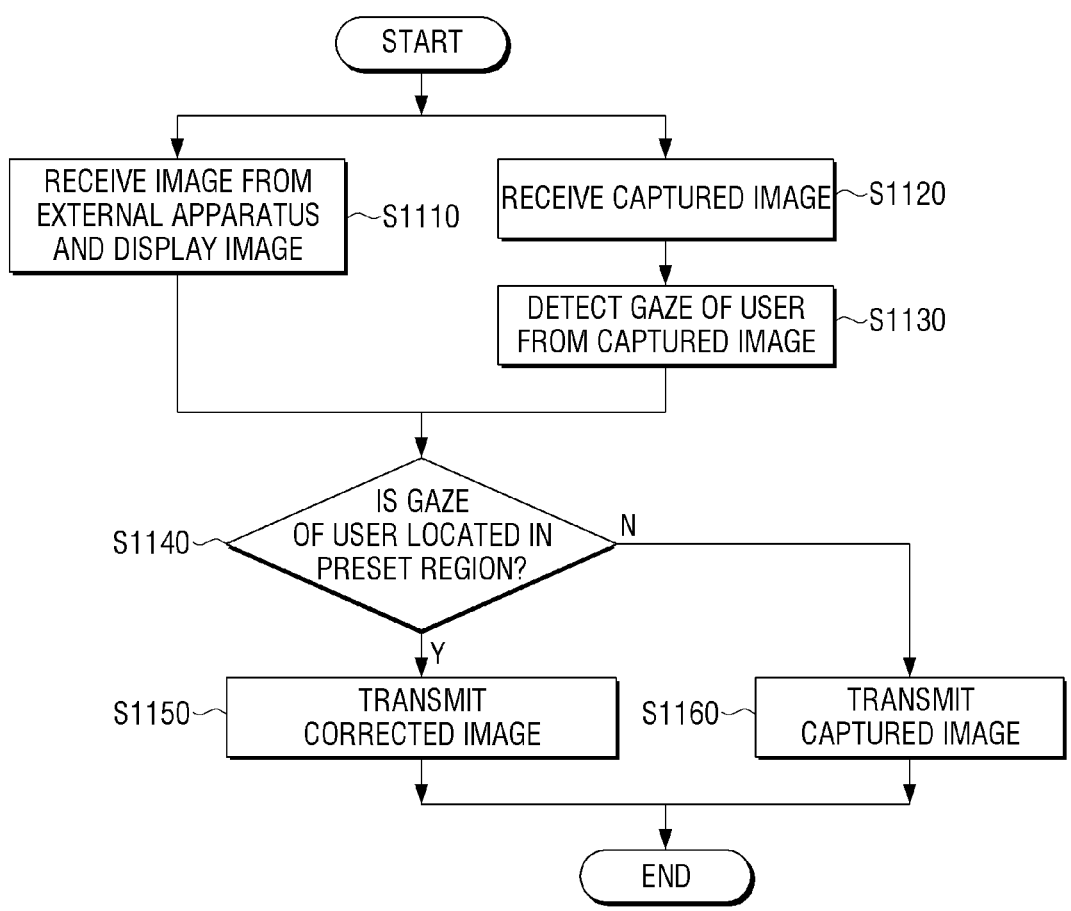
FIG. 11 is a flowchart illustrating an image correction method of a display apparatus according to an exemplary embodiment.

FIG. 11 is a flowchart illustrating an image correction method of a display apparatus according to an exemplary embodiment.

In operation S1110, the display apparatus 100 may receive an image from an external apparatus and display the received image. The external apparatus may be an apparatus which performs a video call with the display apparatus 100. The received image may be an image in which a user of the external apparatus, i.e., a video call counterpart, is captured.

In operation S1120, the display apparatus 100 may receive a captured image generated by the imaging apparatus 200.

In operation S1130, the display apparatus 100 may detect a point of gaze of the user from the captured image.

If the user's gaze is not detected from the captured image, the display apparatus 100 may transmit the captured image without correction of the user's eyes to the external apparatus, i.e., an apparatus of the video call counterpart.

In operation S1140, if the user's point of gaze is detected from the captured image, the display apparatus 100 may determine whether or not the user is looking at a preset region of the image received from the external apparatus, i.e., the user's point of gaze is located in the preset region. The preset region may refer to a region corresponding to a specific object in an image. For example, the preset region may include a region in which the video call counterpart is displayed, a region in which at least one of both eyes of the video call counterpart is displayed, a region in which a nose of the video call counterpart is displayed, a region obtained by extending a region corresponding to the eye of the video call counterpart according to preset extension information, and the like.

In operation S1150, if it is determined that the user's point of gaze is located in the preset region of the image received from the external apparatus (S1140-Y), the display apparatus 100 may generate a corrected image by editing the eyes of the user in the captured image and transmit the corrected image to the external apparatus.

In operation S1160, if it is determined that the user's point of gaze is not located in the preset region of the image received from the external apparatus (S1140-N), the display apparatus 100 may transmit the non-corrected captured image to the external apparatus.

In addition to the operations described with reference to FIG. 11, other operations described with reference to FIGS.

1 to 10, such as image correction may be further performed in an exemplary embodiment, as aforementioned.

The image correction method of a display apparatus 100 according to an exemplary embodiment may be implemented with a program including an executable algorithm which may be executed in a computer, and the program may be stored in a non-transitory computer-readable medium and provided. The non-transitory computer-readable medium may be installed in various apparatuses and used.

The non-transitory computer-readable medium is not a medium configured to temporarily store data such as a register, a cache, or a memory but an apparatus-readable medium configured to permanently or semi-permanently store data. For example, programs for performing the various methods may be stored in the non-transitory apparatus-readable medium such as a compact disc (CD), a digital versatile disc (DVD), a hard disc, a Blu-ray disc, a universal serial bus (USB), a memory card, or a read only memory (ROM), and provided.

Accordingly, the programs may be installed in various apparatuses to perform an image correction operation, and thus callers may perform a video call with eye contact during video calling.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A display apparatus comprising:
a display configured to display a first image received from an external apparatus;
a communicator configured to receive a second image generated by capturing an appearance of a user while the first image is displayed;
a processor configured to:
obtain a point of gaze of the user from the second image,
based on the point of gaze being located in a region of the first image other than a predetermined region of the first image,
control the communicator to transmit the second image to the external apparatus, and
based on the point of gaze being located in the predetermined region of the first image, generate a third image by placing an iris of the user at a predetermined position in the third image different than a position of the iris of the user in the second image and control the communicator to transmit the third image to the external apparatus,
wherein the predetermined region of the first image is a region corresponding to a person in the first image.

2. The display apparatus as claimed in claim 1, wherein the point of gaze is located in a region corresponding to an eye of a person in the first image when the iris of the user is placed at the predetermined position in the third image.

3. The display apparatus as claimed in claim 1, wherein the processor is further configured to detect an eye of a person from the first image, and
wherein the processor is further configured to control the communicator to transmit the second image to the external apparatus based on no eyes being detected from the first image.

4. The display apparatus as claimed in claim 1, wherein the display is further configured to display a plurality of images received respectively from a plurality of external apparatuses, and
wherein the processor is further configured to determine whether the point of gaze is located in a preset region in each of the plurality of images.

5. The display apparatus as claimed in claim 4, wherein the processor is further configured to determine a counterpart image among the plurality of images, the point of gaze being located in the preset region of the counterpart image, and control the communicator to transmit the third image to a corresponding external apparatus among the plurality of external apparatuses.

6. The display apparatus as claimed in claim 5, wherein the processor is further configured to control the communicator to transmit the second image to remaining external apparatuses.

7. A video call system comprising:
a display apparatus configured to receive a first image from an external apparatus and display the first image; and
an imaging apparatus configured to generating a second image by capturing an appearance of a user while the first image is displayed,
wherein the display apparatus is further configured to:
obtain a point of gaze of the user from the second image,
based on the point of gaze being located in a region of the first image other than a predetermined region of the first image, transmit the second image to the external apparatus, and
based on the point of gaze being located in the predetermined region of the first image, generate a third image by placing an iris of the user at a predetermined position in the third image different than a position of the iris of the user in the second image and transmit the third image to the external apparatus,
wherein the predetermined region of the first image is a region corresponding to a person in the first image.

8. An image correction method of a display apparatus, the method comprising:
displaying a first image received from an external apparatus;
receiving a second image generated by capturing an appearance of a user while the first image is displayed;
obtaining a point of gaze of the user from the second image;
based on the point of gaze being located in a region of the first image other than a predetermined region of the first image,
transmitting the second image to the external apparatus; and
based on the point of gaze being located in the predetermined region of the first image, generating a third image by placing an iris of the user at a predetermined position in the third image different than a position of the iris of the user in the second image and transmitting the third image to the external apparatus,
wherein the predetermined region of the first image is a region corresponding to a person in the first image.

9. The method as claimed in claim 8, wherein the point of gaze is located in a region corresponding to an eye of a person in the first image when the iris of the user is placed at the predetermined position in the third image.

10. The method as claimed in claim 8, further comprising:
   detecting an eye of a person from the first image, and
   transmitting the second image to the external apparatus based on no eyes being detected from the first image.

11. The method as claimed in claim 8, wherein the displaying comprises displaying a plurality of images received from a plurality of external apparatuses including the external apparatus, and
   wherein the obtaining comprises determining whether the point of gaze is located in a preset region in each of the plurality of images.

12. The method as claimed in claim 11, further comprising:
   determining a counterpart image among the plurality of images, the point of gaze being located in the preset region of the counterpart image, and
   transmitting the third image to a corresponding external apparatus among the plurality of external apparatuses.

13. The method as claimed in claim 12, further comprising transmitting the second image to remaining external apparatuses.

\* \* \* \* \*